United States Patent
Dabic et al.

(10) Patent No.: US 10,705,609 B2
(45) Date of Patent: Jul. 7, 2020

(54) CONTROL DEVICE FOR MOTOR VEHICLE AND CONTROL METHOD

(71) Applicant: DAV, Créteil (FR)

(72) Inventors: Stéphanie Dabic, Créteil (FR); Jean-Marc Tissot, Créteil (FR)

(73) Assignee: DAV, Créteil (FR)

( * ) Notice: Subject to any disclaimer, the term of this patent is extended or adjusted under 35 U.S.C. 154(b) by 142 days.

(21) Appl. No.: 15/105,726

(22) PCT Filed: Dec. 18, 2014

(86) PCT No.: PCT/FR2014/000286
§ 371 (c)(1),
(2) Date: Jun. 17, 2016

(87) PCT Pub. No.: WO2015/092163
PCT Pub. Date: Jun. 25, 2015

(65) Prior Publication Data
US 2017/0031442 A1 Feb. 2, 2017

(30) Foreign Application Priority Data

Dec. 19, 2013 (FR) ...................................... 13 03011

(51) Int. Cl.
*G06F 3/01* (2006.01)
*B60K 37/06* (2006.01)
(Continued)

(52) U.S. Cl.
CPC .............. *G06F 3/016* (2013.01); *B60K 35/00* (2013.01); *B60K 37/06* (2013.01); *G06F 3/0354* (2013.01);
(Continued)

(58) Field of Classification Search
None
See application file for complete search history.

(56) References Cited

U.S. PATENT DOCUMENTS

2006/0109256 A1* 5/2006 Grant ...................... G06F 3/016
345/173
2006/0181520 A1* 8/2006 Ikegawa ............. G06F 3/04886
345/173

(Continued)

FOREIGN PATENT DOCUMENTS

WO 2013169299 A1 11/2013

OTHER PUBLICATIONS

International Search Report issued in corresponding application No. PCT/FR2014/000286 dated Apr. 21, 2015 (4 pages).

(Continued)

*Primary Examiner* — Matthew Yeung
(74) *Attorney, Agent, or Firm* — Osha Liang LLP

(57) ABSTRACT

The invention relates to a control device for a motor vehicle, which includes: a touch-sensitive surface (2) including a contact sensor capable of measuring a pressing pressure on the touch-sensitive surface (2) during a predetermined time (dt; dt1, dt2), and a haptic feedback module (4) configured such as to generate a haptic feedback in response to a contact of the touch-sensitive surface (2), characterised in that the haptic feedback module (4) is configured such as to determine the profile of the haptic feedback to be generated in accordance with the variation in the pressing pressure measured on the touch-sensitive surface (2) during the predetermined time (dt; dt1, dt2).

20 Claims, 2 Drawing Sheets

(51) Int. Cl.
  *G06F 3/041*   (2006.01)
  *G06F 3/0354*  (2013.01)
  *B60K 35/00*   (2006.01)
  *G06F 3/16*    (2006.01)

(52) U.S. Cl.
  CPC .......... *G06F 3/0414* (2013.01); *G06F 3/0416* (2013.01); *G06F 3/16* (2013.01); *B60K 2370/1438* (2019.05); *B60K 2370/1442* (2019.05); *B60K 2370/158* (2019.05); *G06F 2203/014* (2013.01)

(56) References Cited

U.S. PATENT DOCUMENTS

| | | | | |
|---|---|---|---|---|
| 2008/0024459 | A1* | 1/2008 | Poupyrev | G06F 3/016 345/173 |
| 2010/0156844 | A1* | 6/2010 | Paleczny | G06F 3/016 345/174 |
| 2010/0271326 | A1* | 10/2010 | Hu | G06F 3/0414 345/174 |
| 2011/0279380 | A1* | 11/2011 | Weber | G06F 3/016 345/173 |
| 2012/0032801 | A1* | 2/2012 | Ujii | G06F 3/016 340/540 |
| 2012/0056848 | A1 | 3/2012 | Yamano et al. | |
| 2012/0162114 | A1* | 6/2012 | Inoue | G06F 3/016 345/173 |
| 2014/0062927 | A1* | 3/2014 | Hirose | G06F 3/016 345/173 |
| 2015/0097795 | A1* | 4/2015 | Lisseman | B62D 1/04 345/173 |

OTHER PUBLICATIONS

Written Opinion of the International Searching Authority issued in corresponding application No. PCT/FR2014/000286 dated Apr. 21, 2015 (6 pages).

Stewart, Craig, et al. "Characteristics of pressure-based input for mobile devices." Proceedings of the SIGCHI Conference on Human Factors in Computing Systems. ACM, 2010.†

Chen, Hsiang-Yu, et al. "Design and evaluation of identifiable key-click signals for mobile devices." IEEE Transactions on Haptics 4.4 (2011): 229-241.†

Nashel, Andrew, and Sharif Razzaque. "Tactile virtual buttons for mobile devices." CHI 2003 extended abstracts on Human factors in computing systems. ACM, 2003.†

\* cited by examiner
† cited by third party

CONTROL DEVICE FOR MOTOR VEHICLE AND CONTROL METHOD

The present invention relates to a control device for an automotive vehicle and to a method for commanding said control device.

In the last few years, automobiles have become easier to drive with the appearance of new emerging technologies (for example power steering, ABS, cruise control, parking sensors, etc.). However, the number of functions to be controlled while driving has paradoxically also greatly increased. This may create a certain complexity relating to unfamiliarity with the use of these functionalities and their diversity. The automobile has become a veritable living space, perceived as an interconnected and personal center of communication: with for example MP3 player and GPS functionalities and connection with cellphones.

The introduction of these new functions has led to an increase in the number of buttons on automobile passenger-compartment dashboards. However, the number of buttons cannot increase indefinitely, in particular because of the complexity engendered, space limitations, accessibility or cognitive load. In addition, the interaction of the driver with on-board systems in the automobile may create a situation of attentional overload in which the driver cannot optimally process all the information of the driving task, leading to mistakes and to detection times that are too long.

One option is to centralize the buttons by replacing them with a touchscreen. This makes it possible to continue to increase the number of functions, the latter becoming programmable and reconfigurable and being displayed temporarily or permanently depending on the context or the activated function. The screen thus enables multifunctionality, while virtualizing the buttons and being personalizable. In addition, screens have three other major advantages: firstly they allow direct interaction (the display and input are co-located), secondly they are flexible (the display may easily be configured for a certain number of functions), and lastly they are intuitive (familiar methods of interaction, such as a pointer for example, may be used).

However, contrary to the case of a push button, when the driver interacts with a touchscreen he receives no feedback related directly to his action on the interface, other than the simple contact of his finger pressing against the screen.

In order to compensate for the loss of information caused by the substitution of conventional mechanical interfaces with touchscreens, provision is made to add a stimulus, such as a haptic stimulus, to provide feedback from the system to the user. This stimulus allows ambiguity as to whether the action of the user has been registered by the system, and that is liable to be instrumental in the appearance of dangerous situations, to be avoided. However, it is furthermore necessary to avoid overloading the driver's visual and auditory pathways, which are already greatly taxed by the driving task. Specifically, the use of touchscreens in an automotive vehicle must not distract the driver.

One aim of the present invention is to provide a control device and a method for commanding said control device, which improves the stimulation of the user without interfering with his driving, which is easily perceived and appreciated by the users, and which is able to be discriminated from other signals for a touch-screen application satisfying automotive constraints.

For this purpose, one subject of the present invention is a control device for an automotive vehicle, including:

- a touch surface including a contact sensor able to measure a press pressure on the touch surface during a predetermined duration; and
- a sensory stimulus module configured to generate a sensory stimulus in response to a contact with the touch surface;

characterized in that the sensory stimulus module is configured to determine the profile of the sensory stimulus to be generated depending on the press pressure variation measured on the touch surface during the predetermined duration.

Contrary to a situation in which a given sensory stimulus is generated independently of whether the press of the user is hard, medium or soft, the proposed control device improves the impression of pressing by making the profile of the sensory stimulus correspond to the variation in the press pressure. Distinct sensory stimuli are generated depending on whether the press pressure variation is large, middling or small. Thus, the sensory stimulus generated on each of the interactions of a given user may differ depending on the force exerted on the touch surface.

Provision may furthermore be made for:

- the sensory stimulus module to be configured to evaluate the variation speed of the press pressure and to determine the profile of the generated sensory stimulus depending on the variation in the press pressure and depending on the variation speed of the press pressure during the predetermined duration;
- the sensory stimulus module to be configured to determine the variation acceleration of the press pressure and to determine the profile of the generated sensory stimulus depending on the variation in the press pressure and depending on the variation acceleration of the press pressure during the predetermined duration.

The correspondence between the stimulation and the press is further improved when the profile of the sensory stimulus is based on a pair of parameters that are representative of the press pressure. The profile of the sensory stimulus is for example based on the parameter pair defined by the press pressure variation and the variation speed of the press pressure or on the pair defined by the press pressure variation and the variation acceleration of the press pressure. A short hard press thus provokes a sensory stimulus distinct from a slow soft press or a short soft press or even a slow hard press.

According to one exemplary embodiment, the sensory stimulus includes at least two components chosen from a vibration, a sound and a visual representation. Specifically, a sensory stimulus including at least two components of different sensorial modalities has the advantage that, for the user, the presentation of one of the components will activate the other. For example, the presentation of a visual prime associated beforehand with an audio component facilitates the perceptive processing of audio targets by the user, simply presenting the visual component reactivating the associated audio component.

The various components of the sensory stimulus are for example generated so as to be perceived at different times. The visual component is for example generated so as to be perceived before the audio and/or vibration components. The vibration component is for example generated so as to be perceived before the audio component. For example, to do this the various components of the sensory stimulus are generated at different times. This desynchronization of the perceptions of the components of the sensory stimulus allows the time-lags of the tactile, auditory or visual stimuli sometimes found with conventional mechanical buttons, and that are related to their mechanical operation, to be better reproduced.

According to one exemplary embodiment, the sensory stimulus module includes a library of sensory stimuli indexed at least by press pressure.

According to another exemplary embodiment, the sensory stimulus module is configured to determine the profile of the sensory stimulus using a preprogrammed control law at least depending on the variation in the press pressure.

Another subject of the invention is a method for commanding a control device for an automotive vehicle such as described above in which method a sensory stimulus is generated in response to a contact with the touch surface, characterized in that the profile of the generated sensory stimulus is determined depending on the variation in the press pressure measured on the touch surface during a predetermined duration.

According to one exemplary embodiment of the command method, the variation speed of the press pressure is determined and the profile of the generated sensory stimulus is also determined depending on the variation speed of the press pressure during the predetermined duration.

According to another exemplary embodiment of the command method, the variation acceleration of the press pressure is determined and the profile of the generated sensory stimulus is also determined depending on the variation acceleration of the press pressure during the predetermined duration.

According to one exemplary embodiment of the command method:
- a first sensory stimulus is generated for a press pressure variation lower than 1.2 N;
- a second sensory stimulus is generated for a press pressure variation comprised between 1.2 N and 1.5 N; and
- a third sensory stimulus is generated for a press pressure variation larger than 1.5 N, the first, second and third sensory stimuli being distinct from one another.

According to one exemplary embodiment of the command method, the profile of a vibratory-type sensory stimulus is modified by modifying the value of at least one parameter chosen from the amplitude, the duration, the acceleration and the frequency of the vibration.

The first, second and third sensory stimuli are for example vibrations, at least one parameter chosen from amplitude, duration and acceleration having a value that increases with the increase in the press pressure variation.

According to one exemplary embodiment of the command method:
- an increase in the press pressure is measured over a predetermined duration and a press sensory stimulus is generated the profile of which depends on the variation in the measured press pressure;
- then, when the measured press pressure ceases to increase and decreases, a decrease in the press pressure is measured over a predetermined duration and a release sensory stimulus is generated the profile of which depends on the variation in the measured press pressure.

Thus, the "push and release" of a mechanical button is simulated. Furthermore, the press sensory stimulus may be different from the release sensory stimulus, depending on the strengths and possibly depending on the speeds of the press for the actuation of a key type button.

The command method for example makes provision for a delay duration for which no sensory stimulus is generated after the generation of the press sensory stimulus. A sensation of abutment of the depression is thus simulated.

According to another example, an abutment sensory stimulus is generated after the generation of the press sensory stimulus. The abutment sensory stimulus, intermediate between the press sensory stimulus and the release sensory stimulus, allows the mechanical sensation of abutment perceived when a key reaches its stop to be reproduced.

Furthermore, provision may be made not to generate any sensory stimulus if the measured press pressure ceases to increase and decreases with a press pressure variation smaller than a predetermined pressure variation threshold after the generation of the press sensory stimulus. Specifically, when the finger of the user remains pressed against the touch surface while exerting a small pressure variation, even after a delay duration, the user must keep control of the release and therefore not activate a function without wanting to if the latter is activated on release and if the press pressure variation is insufficient.

The predetermined duration during which the press pressure variation is measured is for example shorter than 30 milliseconds.

BRIEF DESCRIPTION OF THE DRAWINGS

Other advantages and features will become clear on reading the description of the invention, and from the appended figures which show an exemplary nonlimiting embodiment of the invention and in which.

In these figures, identical elements have been given the same reference numbers.

DETAILED DESCRIPTION

Figure 1:
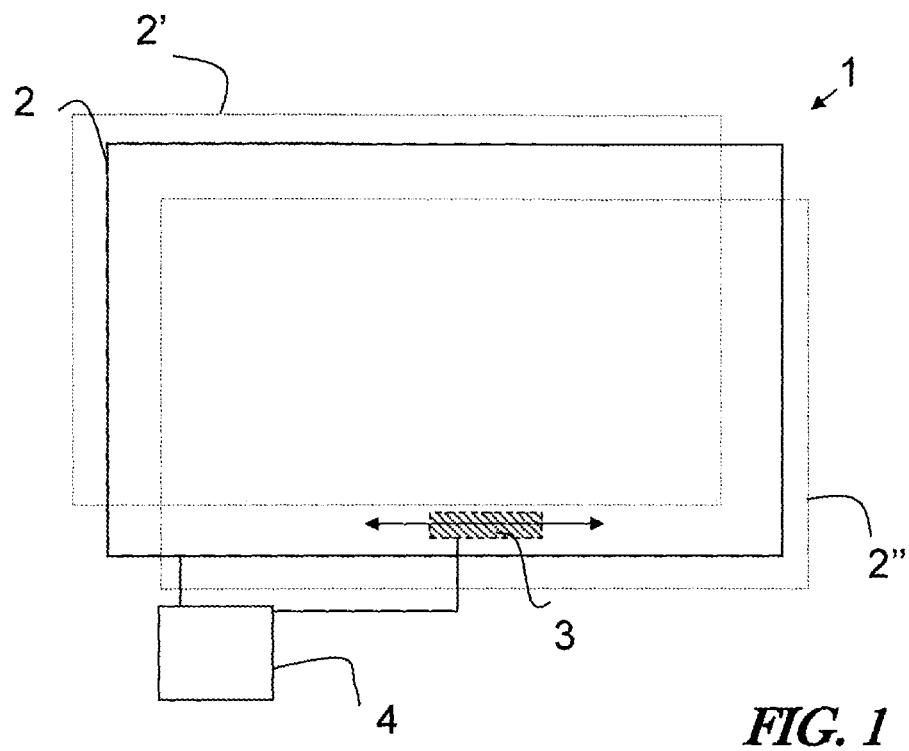
FIG. 1 shows an exemplary control device for an automotive vehicle.

FIG. 1 shows a control device for an automotive vehicle 1, for example arranged in a dashboard of the vehicle.

The control device 1 includes a touch surface 2 and a sensory stimulus module 4 configured to generate a sensory stimulus in response to a contact with the touch surface 2 by a finger or any other activating means (for example a stylus) of a user having for example modified or selected a command.

The touch surface 2 is for example a touch screen. A touch screen is an input periphery allowing users of a system to interact therewith through touch. It allows the user to interact directly with the zone that he wants to select for various purposes such as for example to select a destination address or a name in an address book, to adjust the air-conditioning system, to activate a dedicated function, to select a route from a list, or generally to scroll through a list of choices and to select, validate and correct a choice.

The touch surface 2 includes a panel bearing a contact sensor able to measure a press pressure on the touch surface during a predetermined duration.

The contact sensor is for example a pressure sensor, such as one using a force sensing resistor (FSR) technology, i.e. using pressure sensitive resistors. FSR technology is very resistant and robust while nonetheless having a high resolution. In addition, it is very reactive and precise, while being relatively stable over time. It may have a quite long lifetime, and is usable with any type of activating means, at relatively low cost.

In one FSR technology, the sensor functions by sensing when two conductive layers make contact, for example under the action of a finger. One embodiment consists in covering a glass plate with a layer of conductive ink, on which is superposed a flexible polyester sheet, itself covered on its internal face with a layer of conductive ink. Transparent insulating pads insulate the plate from the polyester sheet. The activation of the touch surface produces a slight depression in the polyester layer, which makes contact with the conductive layer of the glass plate. The local contact of the two conductive layers leads to a modification in the electrical current applied to the plate, corresponding to a voltage gradient.

According to another example, the contact sensor comprises flexible semiconductor layers sandwiched between, for example, a conductive layer and a resistive layer. By exerting a pressure or a swipe on the FSR layer, its ohmic resistance decreases thus allowing, by application of a suitable voltage, the applied pressure and/or the position of the location where the pressure is being exerted to be measured.

According to another example, the contact sensor is based on a capacitive technology.

The sensory stimulus is for example a haptic stimulus; by "haptic" what is meant is a stimulus of the sense of touch. Thus, the haptic stimulus is for example a vibratory or vibrotactile signal. In this case, the sensory stimulus module 4 includes at least one actuator 3 connected to the panel of the touch surface 2, to generate a vibration depending on a signal issued from the contact sensor. The vibration is for example directed in the plane of the touch surface 2 or orthogonally to the plane of the touch surface 2 or even directed in a combination of these two directions.

The haptic stimulus is a vibratory signal such as a vibration produced by a sinusoidal command signal or by a command signal including a pulse or a succession of pulses, sent to the actuator 3. In the case of a plurality of actuators, the latter are arranged under the touch surface 2, in various positions (at the center or on one side) or with various orientations (in the direction of the press on the surface or on another axis).

According to one exemplary embodiment, the actuator 3 is based on a technology similar to that of voice coils. It includes a fixed portion and a portion that is translationally movable in a gap of the fixed portion, for example of about 200 μm, between a first and second position, parallelly to a longitudinal axis of the movable portion. The movable portion is for example formed by a movable magnet sliding in the interior of a fixed coil or by a movable coil sliding around a fixed magnet, the movable portion and the fixed portion interacting electromagnetically. The movable portions are connected to the panel so that the movement of the movable portions engenders the translational movement of the panel in order to deliver the haptic stimulus to the finger of the user. This technology is easily controllable and allows large weights, such as that of a screen, to be moved at various frequencies and meets the very strict constraints of the automotive industry that are a low cost, a good resistance to large temperature variations, and implementational simplicity.

The sensory stimulus module 4 is configured to determine the profile of the sensory stimulus to be generated depending on the press pressure measured on the touch surface 2 during a predetermined duration. The sensory stimulus profile defines the general form of the sensory stimulus, i.e. its waveform or the all of parameters allowing it to be characterized.

Thus, in use, the press pressure on the touch surface 2 is measured. When a press pressure variation becomes detectable, the press pressure is measured over a predetermined duration dt, for example by taking the mean of the press pressure over the predetermined duration dt.

Furthermore, in order to prevent the user from perceiving a lag between his press and the stimulation, the predetermined duration dt is preferably shorter than 30 milliseconds, such as about 20 milliseconds.

Next, the profile of the sensory stimulus to be generated is determined depending on this measured press pressure variation, for example using a library of sensory stimuli indexed by press pressure variation. Thus, the profile of the sensory stimulus is selected from a plurality of sensory stimuli profiles pre-recorded in the library. According to another example, the profile of the sensory stimulus is determined using a preprogrammed control law for example allowing a parameter of the profile to be calculated depending on the press pressure variation or allowing the press pressure variation to be converted into a sensory stimulus.

For example, a first sensory stimulus is generated for a soft press corresponding to a press pressure variation smaller than 1.2 N, a second sensory stimulus is generated for a medium press corresponding to a press pressure variation comprised between 1.2 N and 1.5 N, and a third sensory stimulus is generated for a hard press corresponding to a press pressure variation larger than 1.5 N. The first, second and third sensory stimuli are distinct from one another.

For example, the profile of the sensory stimulus is modified by modifying the value of at least one parameter chosen from the amplitude, the duration, the acceleration and the frequency of the vibration. The value of these parameters for example increases with the increase in the press pressure variation.

Provision is for example made for the first, second and third sensory stimuli to be vibrations and for at least one parameter chosen from amplitude, duration and acceleration to have values that increase with the increase in the press pressure variation.

For example, the amplitude of the first vibratory stimulus has a value lower than the amplitude of the second vibratory stimulus, the amplitude of the second vibratory stimulus being lower than the amplitude of the third vibratory stimulus. These three sensory stimuli profiles are for example stored in memory in a library indexed by press pressure variation.

According to one exemplary embodiment, the sensory stimulus module 4 is configured to evaluate the variation speed of the press pressure and to determine the profile of the generated sensory stimulus depending on the press pressure variation and depending on the variation speed of the press pressure during the predetermined duration.

According to another exemplary embodiment, the sensory stimulus module 4 is configured to determine the variation acceleration of the press pressure and to determine the profile of the generated sensory stimulus depending on the press pressure variation and depending on the variation acceleration of the press pressure during the predetermined duration.

The correspondence between the stimulation and the press is further improved when the profile of the sensory stimulus to is based on a pair of parameters that are representative of the variation in the press pressure. The profile of the sensory stimulus is for example based on the press pressure variation and on the speed of the variation of the press pressure or on the press pressure variation and on the acceleration of the variation of the press pressure. A short hard press thus provokes a sensory stimulus distinct from a slow soft stimulus or from a short soft press or even a slow hard press.

The sensory stimulus the profile of which depends on the variation in the press pressure measured on the touch surface 2 during the predetermined duration dt is for example generated after a threshold has been crossed. This threshold allowing the generation of the sensory stimulus to be triggered may be a threshold of variation in the press pressure, of speed or acceleration of variations in press pressure or even for example of variation in the area of contact of the finger.

The sensory stimulus for example includes at least two components chosen from a vibration, a sound and a visual representation. A sensory stimulus including at least two components of different sensorial modalities has the advantage that, for the user, the presentation of one of the components will activate the other. For example, the presentation of a visual prime associated beforehand with an audio component facilitates the perceptive processing of audio targets by the user, simply presenting the visual component reactivating the associated audio component.

Furthermore, provision may be made to generate the various components of the sensory stimulus so that they are perceived at different times, for example by spacing their respective generations over time. Thus, the various components of the sensory stimulus are not necessarily perceived simultaneously. For example, when the user ceases to press on the touch surface 2, a perceivable change of visual state may be generated almost immediately whereas the sound may for example be generated with a lag relative to the change of visual state so as to be perceived only after the finger has left the touch surface 2. This desynchronization of the perceptions of the components of the sensory stimulus may correspond as in a conventional pushbutton to the time required by the depressed key to return to its rest state and to the noise that results therefrom.

Thus, contrary to a situation in which a given sensory stimulus is generated independently of whether the press of the user is hard, medium or soft, the proposed control device 1 improves the impression of pressing by making the profile of the sensory stimulus correspond to the variation in press pressure. Distinct sensory stimuli are generated depending on whether the press is hard, medium or soft.

Figure 3:
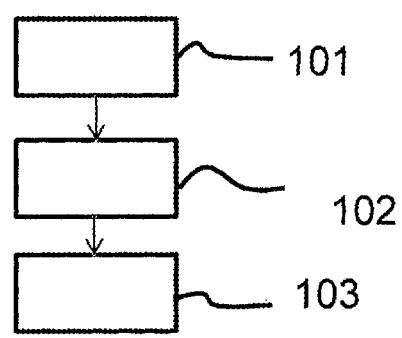
FIG. 3 illustrates a method for commanding a control device.
Figure 2:
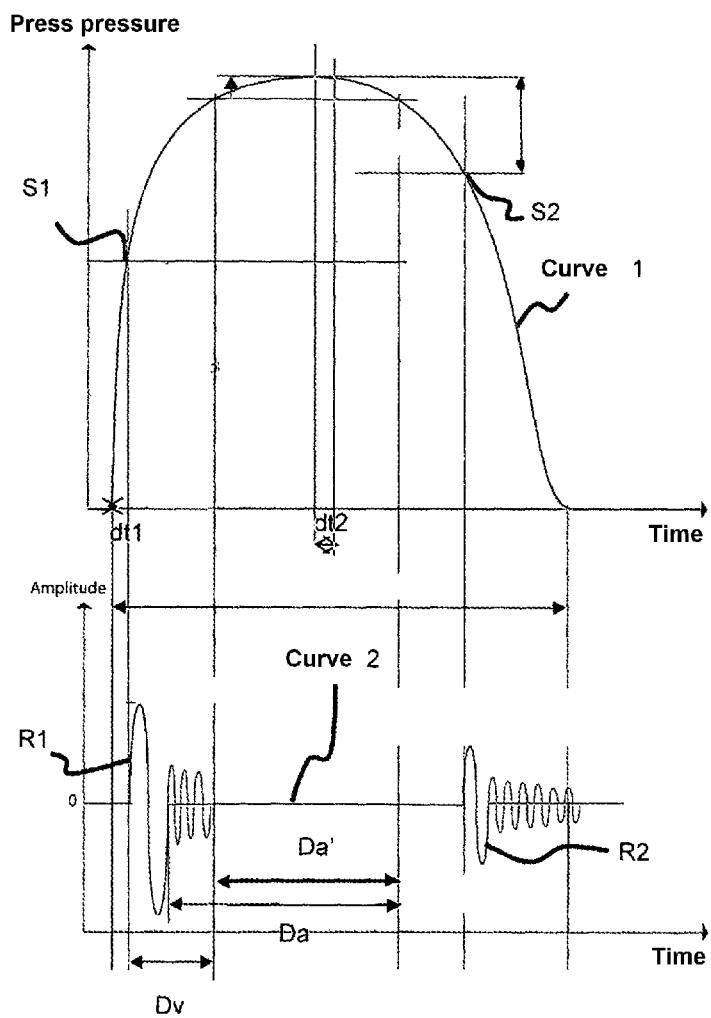
FIG. 2 shows a vibratory stimulus as a function of time (curve 2) placed in correspondence with the press pressure of a user on the touch surface as a function of time (curve 1)

FIGS. 2 and 3 illustrate an exemplary embodiment of the method for commanding the control device in which the sensory stimulus includes at least one vibratory stimulus simulating the "push and release" of a key type button.

As described above, in a first step 101, the press pressure (curve 1) on the touch surface 2 is measured. When a press pressure variation becomes detectable, the press pressure is measured over a first predetermined duration dt1, such as of about 20 milliseconds.

Then, the profile of the press sensory stimulus R1 to be generated is determined depending on this measured press pressure variation, for example using a library of sensory stimuli indexed by press pressure, or even using a preprogrammed control law depending on the press pressure.

As described above, provision is for example made for the press sensory stimulus R1 to generate a first vibration for a press pressure lower than 1.2 N, a second vibration for a pressure comprised between 1.2 N and 1.5 N, and a third vibration for a press pressure higher than 1.5 N. Provision is for example made for the duration of the vibration to vary with the measured press pressure. Thus, a first vibration has a duration shorter than the duration of the second vibration and the duration of the second vibration is less than the amplitude of the third vibration.

The vibration of the press sensory stimulus R1 the profile of which depends on the variation in the press pressure measured on the touch surface 2 during this first predetermined duration dt1 (curve 2) is for example generated after the press pressure has crossed a first pressure threshold S1. The press sensory stimulus R1 perceived by the user may then be different depending on whether or not he has pressed hard against the touch surface 2.

Furthermore, the determination of the press sensory stimulus R1 may also be determined depending on a second parameter, such as the press pressure variation speed or the variation acceleration of the press pressure. Thus, the press sensory stimulus R1 may vary depending on the value of this second parameter.

The vibration is for example produced by a sinusoidal command signal sent to the actuator 3. The vibration sensed extends over the vibration duration Dv (curve 2), which is longer than the duration of the command signal.

In a second step 102, according to a first example, provision is made for a delay duration Da, at least of about 20 ms, between the generation of the two command signals of the press and release sensory stimuli, during which duration no sensory stimulus is generated. Thus, in the example, no command signal is sent to the actuator 3 after that generating the press sensory stimulus R1 during a delay duration Da of 20 ms, i.e. a duration Da' of about 10 ms from the end of the vibration of the touch surface 2 of the press sensory stimulus R1. A sensation of depression abutment is thus simulated.

According to a second example, an abutment sensory stimulus is generated after the generation of the press sensory stimulus R1, for example at the end of the vibration of the touch surface 2 of the press sensory stimulus R1 and/or after a pressure threshold has been crossed, to simulate the sensation of depression abutment between the generation of the press and release sensory stimuli. The abutment sensory stimulus thus allows the mechanical sensation perceived when a depressed key reaches its mechanical stop to be reproduced.

Provision may also be made for no sensory stimulus to be generated if the measured press pressure ceases to increase and decreases with a press pressure variation smaller than a predetermined pressure variation threshold after the generation of the press sensory stimulus R1. Specifically, when the finger of the user remains pressed against the touch surface 2 while exerting a small pressure variation, even after a delay duration Da, the user must keep control of the release and therefore not activate a function without wanting to if the latter is activated on release and if the press pressure variation is insufficient.

Simultaneously, measurement of the press pressure on the touch surface 2 continues.

When the press pressure ceases to increase and decreases enough, a decrease in the press pressure is measured over a second predetermined duration dt2, which will possibly be different from the first predetermined duration dt1.

Next, the profile of the release sensory stimulus R2 to be generated is determined depending on this measured press pressure, for example using a library of sensory stimuli indexed by press pressure, or even using a preprogrammed control law depending on the touch pressure.

Provision is for example made to generate a vibration the amplitude of which depends on the speed of the decrease in the press pressure. Provision may furthermore be made for the vibration of the release sensory stimulus R2 to have an amplitude lower than the amplitude of the vibration of the press sensory stimulus R1, thereby allowing the effect of an existing button to be better copied.

In a third step 103, the vibration of the release sensory stimulus R2 the profile of which depends on the variation in the press pressure measured on the touch surface 2 during this second predetermined duration dt2 (curve 2) is generated for example after the decrease in the press pressure has crossed a second pressure threshold S2.

Furthermore, the emission of the release sensory stimulus R2 is not necessarily conditional upon the abutment sensory stimulus or the end of the delay duration Da. Specifically, in certain cases a release sensory stimulus R2 may be generated even though the abutment sensory stimulus has not yet been emitted or before the delay duration Da has ended, for example because the press pressure has ceased to increase and has decreased enough before the end of the vibration of the touch surface 2 of the press sensory stimulus R1. Specifically, in a mechanical button, it is possible to activate and deactivate a function without having reached the mechanical stop of the button.

According to one exemplary embodiment, the total duration of the sensory stimulus including the first predetermined duration dt1, the vibration duration Dv, the durations of the press and release sensory stimuli R1, R2 and the delay duration Da or the abutment sensory stimulus, is short, i.e. less than 200 ms and preferably comprised between 70 and 200 ms, such as comprised between 110 and 140 ms. Specifically, short signals are better perceived by the user. The frequency of the vibration of the touch surface 2 is for example comprised between 60 and 200 Hz, such as 120 Hz.

The invention claimed is:

1. A control device for an automotive vehicle, comprising:
 a touch surface including a contact sensor that measures a press pressure on the touch surface during a predetermined time duration; and
 a sensory stimulus module that generates a sensory stimulus in response to a contact with the touch surface,
 wherein:
  the sensory stimulus module determines a profile of the sensory stimulus to be generated depending on the press pressure variation measured on the touch surface during the predetermined time duration,
  the predetermined time duration is a combination of, at least, a first predetermined time length and a second predetermined time length, which are distinct and different from one another,
  the first predetermined time length indicates that the press pressure variation becomes detectable on the touch surface,
  the second predetermined time length indicates that the press pressure variation ceases to increase and subsequently starts decreasing on the touch surface,
  the first and second predetermined time lengths are not contiguous along a time domain, and
  wherein the predetermined time duration during which the press pressure variation is measured is shorter than 30 milliseconds.

2. The control device as claimed in claim 1, wherein the sensory stimulus module evaluates the variation speed of the press pressure and determines the profile of the generated sensory stimulus depending on:
 the variation in the press pressure and
 the variation speed of the press pressure during the predetermined time duration.

3. The control device as claimed in claim 1, wherein the sensory stimulus module determines the variation acceleration of the press pressure and to further determine the profile of the generated sensory stimulus depending on:
 the variation in the press pressure and
 the variation acceleration of the press pressure during the predetermined time duration.

4. The control device as claimed in claim 1, wherein the sensory stimulus includes at least two components chosen from a vibration, a sound and a visual representation.

5. The control device as claimed in claim 4, wherein the components of the sensory stimulus are generated to be perceived at different times.

6. The control device as claimed in claim 1, wherein the sensory stimulus module includes a library of sensory stimuli indexed at least by press pressure.

7. The control device as claimed in claim 1, the sensory stimulus module determines the profile of the sensory stimulus using a preprogrammed control that depends on the variation in the press pressure.

8. A method for commanding the control device for an automotive vehicle, the method including:
 measuring a press pressure on a touch surface during a predetermined time duration,
 generating a sensory stimulus in response to a contact with the touch surface,
 wherein a profile of the generated sensory stimulus is determined depending on the press pressure variation measured on the touch surface during the predetermined time duration,
 wherein the predetermined time duration is a combination of, at least, a first predetermined time length and a second predetermined time length, which are distinct and different from one another,
 wherein the first predetermined time length indicates that the press pressure variation becomes detectable on the touch surface,
 wherein the second predetermined time length indicates that the press pressure variation ceases to increase and subsequently starts decreasing on the touch surface,
 wherein the first and second predetermined time lengths are not contiguous along a time domain, and
 wherein the predetermined time duration during which the press pressure variation is measured is shorter than 30 milliseconds.

9. The command method as claimed in claim 8, wherein:
 the variation speed of the press pressure is determined and
 the profile of the generated sensory stimulus is also determined depending on the variation speed of the press pressure during the predetermined time duration.

10. The command method as claimed in claim 8, wherein:
 the variation acceleration of the press pressure is determined and
 the profile of the generated sensory stimulus is also determined depending on the variation acceleration of the press pressure during the predetermined time duration.

11. The command method as claimed in claim 8, wherein:
 a first sensory stimulus is generated for a press pressure variation lower than 1.2 N;
 a second sensory stimulus is generated for a press pressure variation comprised between 1.2 N and 1.5 N; and
 a third sensory stimulus is generated for a press pressure variation larger than 1.5 N, the first, second and third sensory stimuli being distinct from one another.

12. The command method as claimed in claim 8, wherein the profile of a vibratory-type sensory stimulus is modified by modifying the value of at least one parameter chosen from an amplitude, the predetermined time duration, an acceleration, and a frequency of a vibration.

13. The command method as claimed in claim 11, wherein the first, second, and third sensory stimuli are vibrations formed by at least one parameter chosen from an amplitude, a time duration, and an acceleration having a value that increases with an increase in the press pressure variation.

14. The command method as claimed in claim 8, wherein:
an increase in the press pressure is measured over a first portion of the predetermined time duration and a press sensory stimulus is generated with the profile which depends on the variation in the measured press pressure, and
then, when the measured press pressure ceases to increase and decreases, a decrease in the press pressure is measured over the predetermined time duration and a release sensory stimulus is generated with the profile which depends on the variation in the measured press pressure.

15. The command method as claimed in claim 14, wherein a delay time duration for which no sensory stimulus is generated after the generation of the press sensory stimulus.

16. The command method as claimed in claim 8, wherein an abutment sensory stimulus is generated after the generation of a press sensory stimulus, which is different and distinct from the abutment sensory stimulus.

17. The command method as claimed in claim 14, wherein no sensory stimulus is generated if the measured press pressure ceases to increase and decreases with a press pressure variation smaller than a predetermined pressure variation threshold after the generation of the press sensory stimulus.

18. The control device as claimed in claim 4, wherein the vibration included in the sensory stimulus has a vibration time duration that is longer than the first time length and shorter than the predetermined time duration.

19. The command method as claimed in claim 12, wherein the frequency of the vibration is in the range between 60 Hz and 200 Hz.

20. A control device for an automotive vehicle, comprising:
a touch surface including a contact sensor that measures a press pressure on the touch surface during a predetermined time duration; and
a sensory stimulus module that generates a sensory stimulus in response to a contact with the touch surface, wherein:
the sensory stimulus module determines a profile of the sensory stimulus to be generated depending on the press pressure variation measured on the touch surface during the predetermined time duration,
the predetermined time duration is a combination of, at least, a first predetermined time length and a second predetermined time length, which are distinct and different from one another,
an increase in the press pressure is measured over a first portion of the predetermined time duration and a press sensory stimulus is generated with the profile which depends on the variation in the measured press pressure,
then, when the measured press pressure ceases to increase and decreases, a decrease in the press pressure is measured over the predetermined time duration and a release sensory stimulus is generated with the profile which depends on the variation in the measured press pressure, and
a delay time duration for which no sensory stimulus is generated after the generation of the press sensory stimulus.

* * * * *